INVENTOR
ALBERT SCHMID
BY Werner W. Kleeman
ATTORNEY 3,618,412
V-BELT SPEED CONVERTER
Albert Schmid, Schaffhausen, Switzerland, assignor to
Georg Fischer AG, Schaffhausen, Switzerland
Filed Feb. 13, 1970, Ser. No. 11,138
Claims priority, application Switzerland, Feb. 25, 1969,
2,805/69
Int. Cl. F16h 55/52
U.S. Cl. 74—230.17               6 Claims

ABSTRACT OF THE DISCLOSURE

A V- or cone belt-speed converter of the type wherein one cone pulley disc of each cone belt pulley disc is axially displaceable, and wherein the cone pulley discs, viewed in axial direction, are provided with blades or vanes at the side surfaces of the cone belt pulley discs. These vanes are directed outwardly for the purpose of generating an at least approximately radially extending air current which is directed over the side surfaces.

BACKGROUND OF THE INVENTION

The present invention relates to an improved V- or cone belt-speed converter or the like, in which the one cone pulley disc is axially displaceable.

With such type drives or transmissions, during the transmission of gearter loads, such high temperatures occur at the cone belt that the longevity thereof becomes strongly impaired for normal usage at machine tools.

SUMMARY OF THE INVENTION

Accordingly, it is a primary object of the present invention to provide an improved V-belt speed converter or the like which effectively overcomes the aforementioned drawbacks of the prior art constructions.

Still a further significant object of the present invention is the provision of a cone belt-speed converter which does not exhibit the above mentioned disadvantages and only requires a small additional cost beyond that of a conventional drive of this type.

Now, in order to implement these and still further objects of the invention, which will become more readily apparent as the description proceeds, the inventive cone belt-speed converter is generally manifested by the features that cone pulley discs are provided at their side surfaces which are directed toward the outside when viewed in axial direction with blades or vanes for the purpose of generating an at least approximately radially extending air current which is directed over these side surfaces.

BRIEF DESCRIPTION OF THE DRAWING

Other features, objects and advantages of the present invention will become apparent by reference to the following detailed description and drawings, wherein.

DETAILED DESCRIPTION OF THE PREFERRED EMBODIMENT

Figure 1:
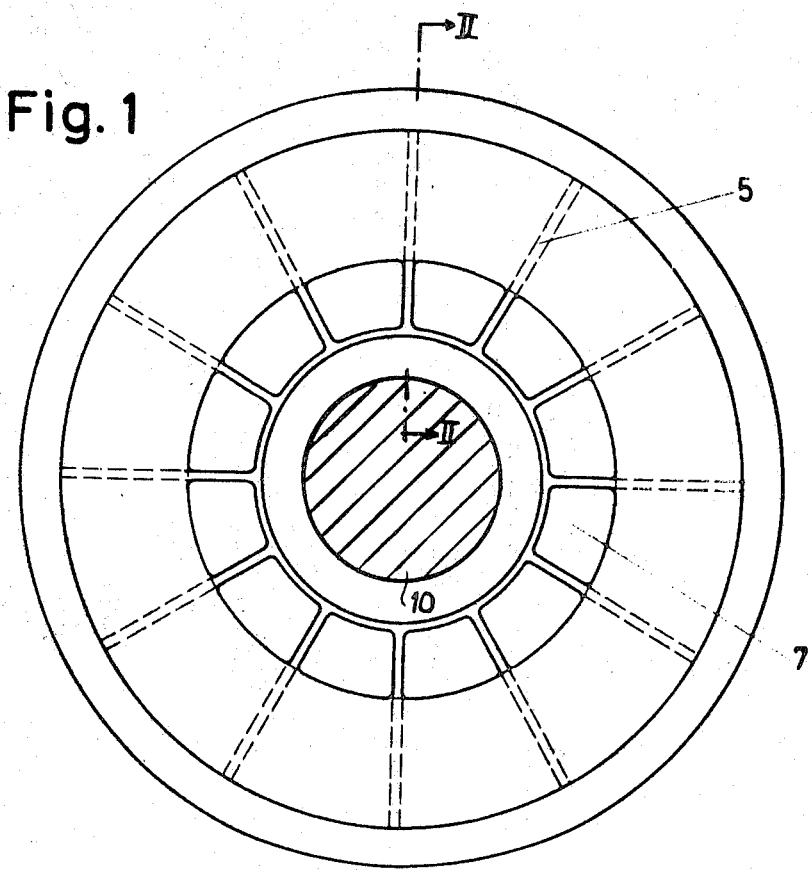
FIG. 1 is a front view of a preferred embodiment of a cone pulley arrangement.

Describing now the drawing, it will be recognized that the cone pulley discs 1 and 2, viewed in axial direction, are provided at their side surfaces 3 and 4, respectively, with radial blades or vanes which are directed towards the outside, as shown. These radial blades or vanes 5 serve to generate an approximately radially extending air current which is directed over these side surfaces 3 and 4.

The blades or vanes 5 are connected with a radially extending substantially ring-shaped plate-like sheet metal cover member 6 which is fixedly mounted to the hub 10 of the cone pulley discs 1 and 2. The cover member 6 is equipped in radial direction, directly adjacent the hub 10, with air inlet openings 7. By virtue of this construction the cone pulley discs 1, 2 are free of internal stresses and can be easily balanced.

During the rotation of the cone pulley discs 1 and 2 of the pulley arrangement an air current is produced by the blades or vanes 5 which travels in a channel and, therefore, cools the cone pulley discs 1, 2, so that there is now possible an extensive increase of the maximum power transmission with constant longevity of the V- or cone belt 8.

Figure 2:
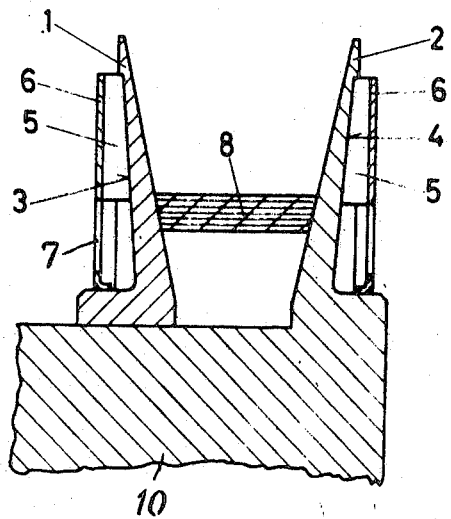
FIG. 2 is a sectional view taken along the line II—II of FIG. 1.

The construction and arrangement of the blades or vanes 5 of the cone pulley shown in FIGS. 1 and 2 is very simple and inexpensive with respect to manufacture while nonetheless very effective.

Naturally, it is also possible to cast the blades or vanes 5 as one piece with the cone pulley discs.

By virtue of the inventive construction it is possible to effectively cool the cone pulley discs 1, 2 without resorting to the aid of a special blower in a very simple manner.

While there is shown and described present preferred embodiments of the invention, it is to be distinctly understood that the invention is not limited thereto but may be otherwise variously embodied and practiced within the scope of the following claims.

What is claimed is:

1. A cone belt-speed converter of the type wherein one cone pulley disc of each cone belt pulley disc is axially displaceable, comprising a pair of cone belt pulley discs having side surfaces located at an outer surface of each pulley discs intended to face away from the belt, blade means on the outer surface of each pulley disc and which are directed outwardly when viewed in axial direction for the purpose of proudcing an air current which extends at least approximately radially and is directed over said side surfaces.

2. The arrangement as defined in claim 1, wherein said blade means are formed as one piece with said pulley discs.

3. The arrangement as defined in claim 1, further including a hub member for said pulley discs, said blade means being mounted upon said hub member.

4. The arrangement as defined in claim 3, further including radially extending cover means with which said blade means are connected.

5. The arrangement as defined in claim 4, wherein said cover means are located in spaced relationship from the associated pulley disc, each of said cover means being provided with air inlet openings communicating with the associated blade means.

6. A cone belt-speed converter comprising a pair of cone belt pulley discs, a cone belt arranged between confronting surfaces of said pair of cone belt pulley discs, each of said cone belt pulley discs having side surfaces located at an outer surface of each pulley disc facing away from and out of contact with said cone belt, blade means located at said outer surface of each pulley disc, said blade means being directed outwardly away from the side surface of its associated pulley disc when viewed in axial direction, said blade means defining airflow channel means physically spaced from and out of direct contact with said cone belt and serving to produce air currents extending at least approximately radially and over said side surfaces of said cone belt pulley discs, to thereby directly cool each of said side surfaces and indirectly to thereby cool said cone belt, without said cone belt interfering with the flow of air through said airflow channel means to thus maximize the cooling effect.

References Cited

UNITED STATES PATENTS

| | | | |
|---|---|---|---|
| 1,385,396 | 7/1921 | Rayburn | 74—230.6 |
| 2,850,852 | 9/1958 | Hofberger | 74—230.6 |
| 2,953,032 | 9/1960 | Ruess | 74—230.6 |

CORNELIUS J. HUSAR, Primary Examiner

U.S. Cl. X.R.

74—230.1, 230.8